United States Patent
Sanchez et al.

(10) Patent No.: US 12,518,291 B2
(45) Date of Patent: Jan. 6, 2026

(54) PREEMPTIVE PICKING OF ITEMS BY AN ONLINE CONCIERGE SYSTEM BASED ON PREDICTIVE MACHINE LEARNING MODEL

(71) Applicant: Maplebear Inc., San Francisco, CA (US)

(72) Inventors: Kenneth Jason Sanchez, Orange, CA (US); Eric Hermann, San Francisco, CA (US); Abhinav Darbari, Seattle, WA (US); Haochen Luo, Conroe, TX (US); Maksym Brodin, Vancouver (CA); Sam Crocker, Brooklyn, NY (US)

(73) Assignee: Maplebear Inc., San Francisco, CA (US)

(*) Notice: Subject to any disclaimer, the term of this patent is extended or adjusted under 35 U.S.C. 154(b) by 326 days.

(21) Appl. No.: 18/079,836

(22) Filed: Dec. 12, 2022

(65) Prior Publication Data
US 2024/0193627 A1    Jun. 13, 2024

(51) Int. Cl.
*G06Q 30/02* (2023.01)
*G06Q 10/083* (2023.01)
*G06Q 30/0202* (2023.01)

(52) U.S. Cl.
CPC ....... *G06Q 30/0202* (2013.01); *G06Q 10/083* (2013.01)

(58) Field of Classification Search
None
See application file for complete search history.

(56) References Cited

U.S. PATENT DOCUMENTS

2022/0092497 A1* 3/2022 Roth ................ G06Q 10/06313

* cited by examiner

*Primary Examiner* — Alan Torrico-Lopez
(74) *Attorney, Agent, or Firm* — Fenwick & West LLP

(57) ABSTRACT

An online concierge system applies a predictive model to predict demand of items, and facilitates preemptive picking of items in advance of receiving orders to enable efficient procurement and delivery. The online concierge system may apply a time-series model and/or machine learning model that predicts demand based on historical data. Depending on the predicted demand, items may be preemptively moved from a storage location to a staging area that enables the items to be more rapidly processed and delivered to customers when orders come in.

19 Claims, 3 Drawing Sheets

PREEMPTIVE PICKING OF ITEMS BY AN ONLINE CONCIERGE SYSTEM BASED ON PREDICTIVE MACHINE LEARNING MODEL

BACKGROUND

In an online concierge system, customers may select items for ordering, procurement and delivery from physical retailers or other warehouses. A significant component of the delay between a customer placing and receiving an order can arise from the time it takes for a picker to retrieve ordered items from a retail shelf or other storage location. Reducing the time to obtain items after an order is placed can result in significantly faster deliveries, which can improve customer satisfaction and profitability.

SUMMARY

In accordance with one or more aspects of the disclosure, an online concierge system processes order requests from customers via a customer application, assigns the order requests to available pickers to procure items from warehouses, and generates routing instructions for facilitating deliveries to the customers in accordance with the order requests. In one or more embodiments, the online concierge system obtains historical orders data and applies a preemptive picking model for predicting, based at least in part on the historical orders data, a predicted demand (e.g., a predicted demand or a predicted future order time) for a future time period of an item available through the online concierge system. Before receiving an order for the item from a customer during the future time period, the online concierge system facilitates deployment of instructions for preemptively picking the item from a storage location in the warehouse to a staging area (e.g., a predefined area of the warehouse, a predefined area outside the warehouse, a predefined area near a delivery location, or in a delivery vehicle) in a quantity based on the predicted demand. The online concierge system receives, from the customer application, an order including the item. Responsive to receiving the order including the item, the online concierge system facilitates instructions for delivery of the item from the staging area to the customer.

In one or more embodiments, applying the preemptive picking model comprises applying a time-series model that predicts the demand for the given time period as a function of at least historical demand for the item in historical time periods derived from the historical orders data. The time-series model may include model hyperparameters that are obtained based on applying a machine learning algorithm to the historical orders data to learn the hyperparameters that yield best predictions.

In one or more embodiments, the machine learning model for learning the hyperparameters may include randomly setting the hyperparameters for a first time period of the historical orders data, evaluating performance of the time-series model for different hyperparameter values, determining initial hyperparameter values based on the performance, further evaluating performance of the time-series model using the initial hyperparameters values, and/or adjusting the initial hyperparameters based on the further performance.

In one or more embodiments, the time-series model comprises at least one of: an autoregressive integrated moving average model (ARIMA), a seasonal autoregressive integrated moving average model (SARIMA), a seasonal autoregressive integrated moving average with exogenous factors (SARIMAX) model, and a recurrent neural network (RNN) model.

Alternatively, the time-series model can be any supervised learning algorithm structured to take advantage of autocorrelation inherent in time series data.

In one or more embodiments, applying the preemptive picking model comprises applying a machine learning model trained based on the historical orders data to predict demand from various data available to the online concierge system.

In one or more embodiments, applying the preemptive picking model comprises identifying characteristics of the customer, and applying the preemptive picking model to predict, based at least in part on the characteristics of the customer, that the customer will order the item during the future time period. The online concierge system may furthermore generate a set of customer-specific predictions of item purchases based on the historical orders data, and aggregate the customer-specific predictions within a geographic area to generate the predicted demand.

In one or more additional or alternative embodiments, a non-transitory computer-readable storage medium stores instructions executable by one or more processors for performing any of the methods described above.

In one or more additional or alternative embodiments, a computer system includes one or more processors and a non-transitory computer-readable storage medium that stores instructions executable by the one or more processors for performing any of the methods described above.

DETAILED DESCRIPTION

Figure 1:
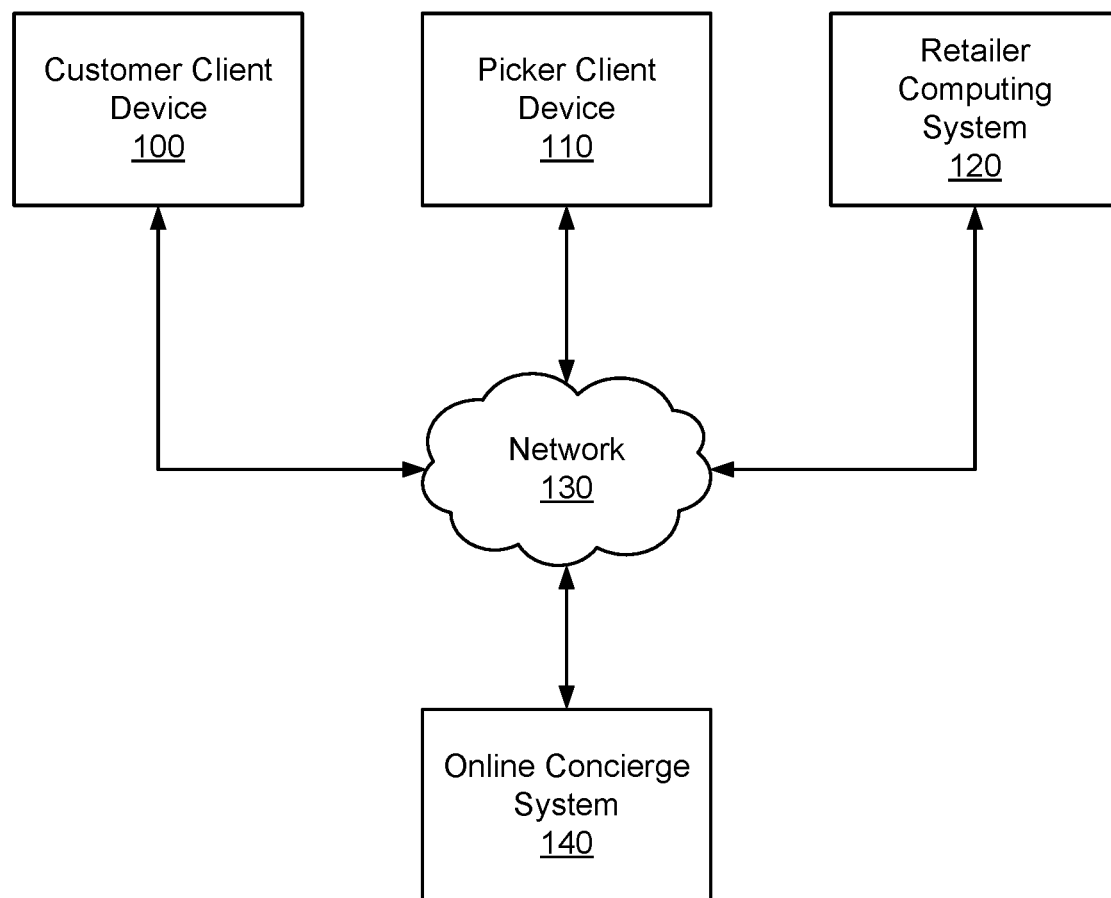
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120. Moreover, the role of the pickers may be performed by humans or by machines designed to automate the picking process, such as robotic systems in a warehouse.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

As will be further described below, at least some items of an order may be preemptively picked by the picker, before the receiving the order. Here, preemptively picked items may be moved to a staging area that enables faster delivery to customers once an order arrives. The picker that performs preemptive picking (before receiving an order) may be the same or a different picker than the one that picks the items from the staging area after receiving an order.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 may provide item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customers client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
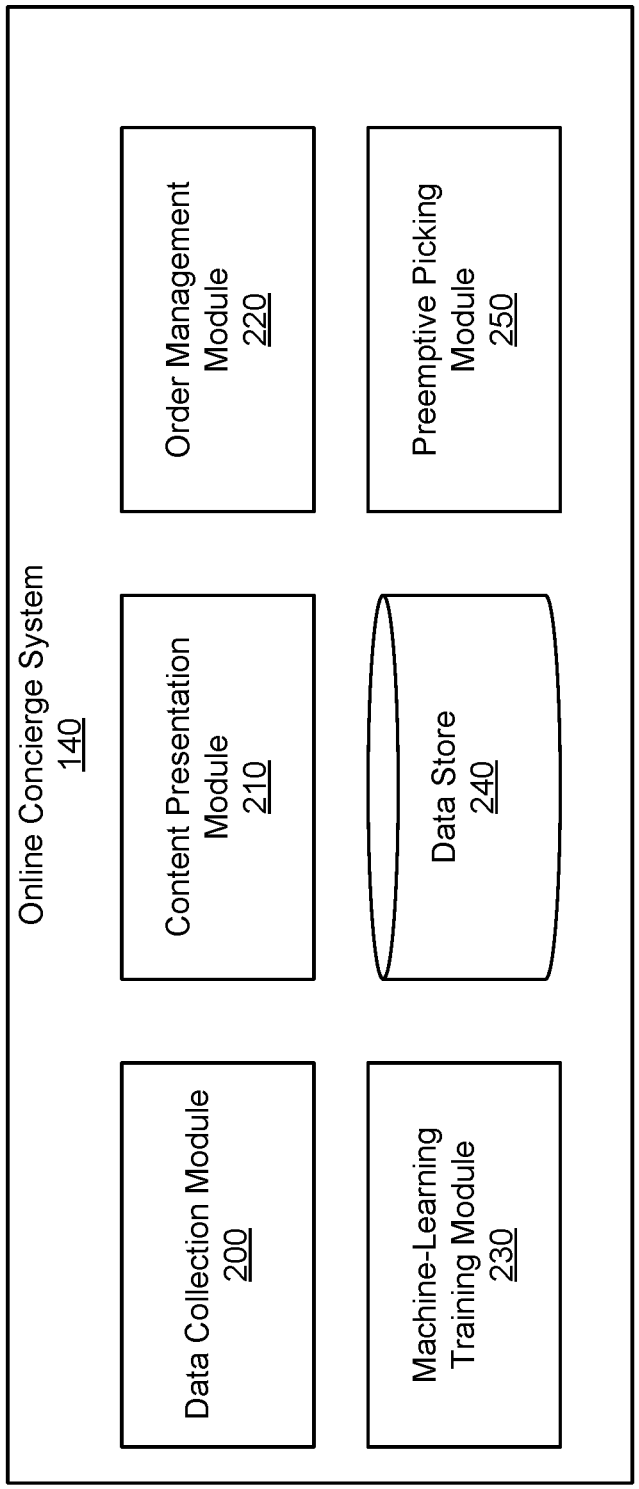
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 may manage orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order, or to an offsite staging area where items have been preemptively picked. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location or other staging area. When the picker arrives, the order management module 220 transmits the order to the picker client device 110 for display to the picker. As the picker uses the picker client device 110 to collect items at the retailer location or other staging location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location.

The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The preemptive picking module 250 facilitates preemptive picking of items in advance of the items being ordered. The preemptive picking module 250 may apply a time-series model and/or machine learning model that predicts demand of items during a given time period. The predicted demand may be expressed as, for example, a predicted sales volume for an item or a predicted future order time of an order that includes the item. Depending on the predicted demand, items may be preemptively moved from a storage location to a staging area that enables the items to be more rapidly processed and delivered to customers when orders come in. An example embodiment of a process for facilitating preemptive picking is described in further detail below with respect to FIG. 3.

Figure 3:
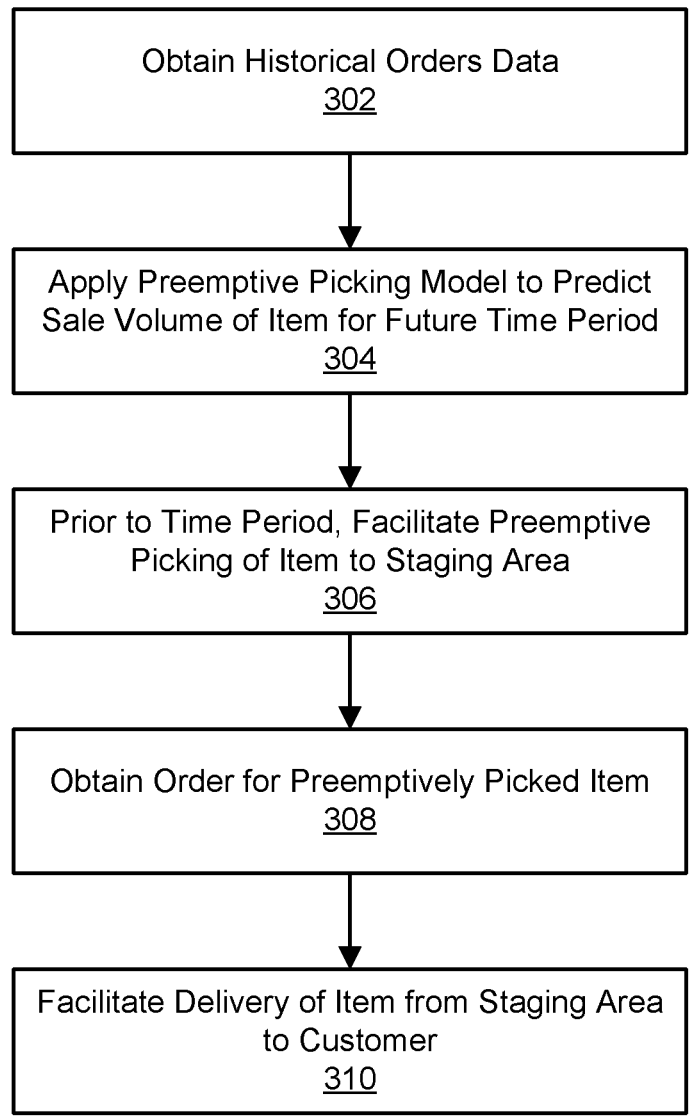
FIG. 3 is a flowchart illustrating an example embodiment of a process for facilitating preemptive picking of items before receiving orders.

FIG. 3 is a flowchart illustrating a method for facilitating preemptive picking of items (before them being ordered) based on a predictive model. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The preemptive picking module 250 obtains 302 historical orders data associated with the online concierge system 140. The historical orders data may include various information obtained by the data collection module 200 described above or information derived from the collected data. The historical orders data may be indexed by time and by item to indicate, for each time index, a volume of each item sold during that time period. The time indices may specify specific order times for individual orders or may include sales data aggregated over a time period (e.g., an hour, a day, a week, a month, a year, etc.) The historical orders data may furthermore represent demand for specific product identifiers or may be aggregated across item categories (e.g., peanut butter). Demand may be specified in terms of quantities, dollar value, or other metrics. The historical orders data may furthermore be indexed by geographic location, retail store, or other fields.

The historical orders data may additionally include other metadata that provide context for the sales. For example, the historical orders data may include information such as an identity of a customer placing the order, a profile of the customer, a location of the customer, a retailer location, a picker associated with the order, delivery times or other metrics associated with the order, a rating or other customer feedback associated with the order, or other relevant metadata. The historical orders data may be filtered to limit it to certain geographic regions, time periods, item categories, or other filtering characteristics.

The preemptive picking module 250 applies 304 a preemptive picking model for predicting, based at least in part on the historical orders data, a predicted demand for a future time period of an item available through the online concierge system 140. In one or more embodiments, the preemptive picking model comprises a time-series model that generates the predicted demand as a function of a sequence of time-ordered historical demand for the item associated with historical time points. The time-series model may comprise, for example, an autoregressive integrated moving average model (ARIMA), a seasonal autoregressive integrated moving average model (SARIMA), a seasonal autoregressive integrated moving average with exogenous factors (SARIMAX) model, a recurrent neural network (RNN) model, or other time-series model.

In one or more embodiments, the preemptive picking model generates the predicted demand for the item based in part on hyperparameters that may be learned using a machine learning approach. For example, in an ARIMA, SARIMA, SARIMAX, or similar model, the hyperparameters p and q may be learned using an machine learning approach, where p represents an order (number of time lags)

of the autoregressive model, and q represents the order of the moving-average model. In this machine learning approach, the time-series model could first be applied to historical orders data covering an initial time period (e.g., a two week period) where the hyperparameters (e.g., p, q) are set randomly. The output of the model can then be evaluated by comparing its predictions to the actual observed demand. After the initial period, the model may be configured using the hyperparameters resulting in the best predictions. The model can continue to be evaluated in subsequent time periods by observing its performance using the currently configured hyperparameters and adjusting the hyperparameters in a manner expected to improve performance in subsequent iterations.

In another embodiment, the preemptive picking model comprises a machine learning model that is not necessarily a time-series model. For example, a supervised learning approach may be used that learns the relationship between demand of an item on a given day (or other time period) and various input signals that may affect demand such as, time of year, location, customer activity, promotions, or other factors.

In one or more embodiments, using either a time-series model or machine learning model, the preemptive picking model may generate customer-specific predictions with respect to different items based on the historical orders data relating to that customer and/or a population of customers. For example, the preemptive picking model may predict likelihoods of an individual customer ordering a specific item on a specific day. In a simple example, if a customer orders a bag of dog food, a box of paper towels, and a jar of pickles every 2nd Tuesday, the model may identify and predict this pattern and preemptively pick these items for that specific customer. An order from the customer may be adjusted if it varies from the predicted order. In more complex examples, the model may make predictions for items that will be ordered by a customer based on more complex patterns and/or external factors that may be predictable by the computer model but not necessarily obvious to a human observer.

The preemptive picking model may furthermore aggregate customer-specific predictions within a geographic area to generate localized aggregate predictions for items in different geographic areas. This technique enables bulk picking of items for multiple predicted orders for different customers.

In one or more embodiments, the above techniques may be employed for separate preemptive picking models for each item or category of items. Thus, preemptive picking models may be separately trained and/or may be based on different hyperparameters and/or inputs to make predictions about different items. In other embodiments, a combined model may be used to generate predictions associated with multiple items from the same underlying preemptive picking model.

The preemptive picking module 250 facilitates 306 deployment of instructions (e.g., to the picker client device 110 and/or retailer computing system 120) for preemptively picking the item from a storage location in the warehouse to a staging area in a quantity based on the predicted demand for the item. In one or more embodiments, the preemptive picking module 250 identifies a subset of items that exceed a predicted demand threshold and selects only those items for preemptively picking. In one or more embodiments, the preemptive picking module 250 may quantize the predicted demand of an item into discrete volumes and preemptively pick the items in accordance with one of the discrete volumes. The quantization may be based on convenient packing and/or shipping volumes that enable the item to be efficiently picked and relocated.

The preemptive picking may involve moving the items from a storage location of the warehouse or outside the warehouse to a staging area that enables the items to be more quickly identified and delivered relative to the storage locations. For example, preemptive picking may involve moving items from retail shelves to a staging area for loading onto delivery vehicles. In another embodiment, the staging area may be an offsite area in a vicinity of customers predicted to order the item. In another embodiment, the staging area may be a vehicle itself, which may be deployed to a location closer to the customers. For example, items may be preloaded onto a vehicle that either remains at the warehouse location until the order comes in, or is deployed in advance to a location associated with predicted orders.

In one or more embodiments, the preemptive picking may furthermore include taking certain steps towards preparing items for delivery. For example, items that are packaged for bulk shipping for wholesalers may be unpacked to a form suitable for delivery to individual customers. Items may also go through pre-delivery steps such as quality checks, pre-scanning, or other processes to enable faster delivery relative to items that are not preemptively picked.

The preemptive picking may occur before orders for the item being made. For example, preemptive picking based on demand for a given day may occur the day or evening before or early on the same day.

After performing the preemptive picking, the preemptive picking module 250 may obtain 308, from the customer client device 100, an order including an item that has been preemptively picked. The preemptive picking module 250 then facilitates 310 delivery of the item from the staging area to the customer, using the techniques described above. Under this approach, the online concierge system 140 may significantly reduce time from order to delivery. Rather than waiting for a picker to locate items on a retail shelf, preemptively picked items are already staged before the order is received, where they can be much more quickly obtained and delivered. By employing strong predictive modeling, the online concierge system 140 can significantly decrease delivery times and improve customer satisfaction.

ADDITIONAL CONSIDERATIONS

The foregoing description of the embodiments has been presented for the purpose of illustration, and many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
    obtaining historical orders data associated with an online concierge system that processes order requests from customers via a customer application, assigns the order requests to available pickers to procure items from warehouses, and generates routing instructions for facilitating deliveries to the customers in accordance with the order requests;
    applying a preemptive picking model to the historical orders data, wherein the preemptive picking model is trained to predict, based at least in part on the historical orders data, a predicted demand for a future time period of an item available through the online concierge system, wherein the preemptive picking model is configured using hyperparameters determined by:
        applying a machine learning model to historical orders data covering an initial time period with randomly selected hyperparameters;
        comparing an output of the machine learning model to observe an error between predicted demand and actual observed demand; and
        adjusting the hyperparameters based on the comparison to reduce the error;
    before receiving an order for the item from a customer during the future time period, sending instructions for preemptively picking the item from a storage location in a warehouse and moving the item to a staging area in a quantity based on the predicted demand, wherein sending the instructions for preemptively picking the item causes preemptive picking of the item from the storage location in the warehouse and moving of the item to the staging area;
    receiving, from the customer application, an order including the item; and
    responsive to receive the order including the item, sending instructions for delivery of the item from the staging area to the customer, wherein sending the instructions for delivery of the item causes delivery of the item from the staging area to the customer.

2. The method of claim 1, wherein applying the preemptive picking model comprises:
    applying a time-series model that predicts the predicted demand for a given time period as a function of at least historical demand for the item in historical time periods derived from the historical orders data.

3. The method of claim 1, wherein determining the hyperparameters further comprises:
    randomly setting the hyperparameters and evaluating performance of the machine learning model for different hyperparameter values.

4. The method of claim 3, wherein the machine learning model comprises at least one of: an autoregressive integrated moving average model (ARIMA), a seasonal autoregressive integrated moving average model (SARIMA), a seasonal autoregressive integrated moving average with exogenous factors (SARIMAX) model, and a recurrent neural network (RNN) model.

5. The method of claim 3, wherein the machine learning model comprises a supervised learning algorithm structured to take advantage of autocorrelation inherent in time series data.

6. The method of claim 1, wherein applying the preemptive picking model comprises:
    applying a machine learning model trained based on the historical orders data to infer demand from various data available to the online concierge system.

7. The method of claim 1, wherein applying the preemptive picking model comprises:
    identifying characteristics of the customer; and
    applying the preemptive picking model to predict, based at least in part on the characteristics of the customer, that the customer will order the item during the future time period.

8. The method of claim 1, wherein applying the preemptive picking model comprises:

generating a set of customer-specific predictions of item purchases for the item based on the historical orders data; and aggregating customer-specific predictions within a geographic area to generate the predicted demand.

9. The method of claim 1, wherein applying the preemptive picking model comprises:

identifying characteristics of the warehouse location such as comparative sales by other stores, socioeconomic factors, geographic factors, and weather factors; and applying the preemptive picking model to predict, based at least in part on the characteristics of the warehouse location, what orders will be made for the warehouse location.

10. The method of claim 1, wherein the staging area comprises a predefined area of the warehouse, a predefined area outside the warehouse, and a delivery vehicle.

11. A non-transitory computer-readable storage medium storing instructions executable by one or more processors for performing steps including:

obtaining historical orders data associated with an online concierge system that processes order requests from customers via a customer application, assigns the order requests to available pickers to procure items from warehouses, and generates routing instructions for facilitating deliveries to the customers in accordance with the order requests;

applying a preemptive picking model to the historical orders data, wherein the preemptive picking model is trained to predict, based at least in part on the historical orders data, a predicted demand for a future time period of an item available through the online concierge system, wherein the preemptive picking model is configured using hyperparameters determined by:

applying a machine learning model to historical orders data covering an initial time period with randomly selected hyperparameters; comparing an output of the machine learning model to observe an error between predicted demand and actual observed demand; and adjusting the hyperparameters based on the comparison to reduce the error;

before receiving an order for the item from a customer during the future time period, sending instructions for preemptively picking the item from a storage location in a warehouse and moving the item to a staging area in a quantity based on the predicted demand, wherein sending the instructions for preemptively picking the item causes preemptive picking of the item from the storage location in the warehouse and moving of the item to the staging area;

receiving, from the customer application, an order including the item; and responsive to receive the order including the item, sending instructions for delivery of the item from the staging area to the customer, wherein sending the instructions for delivery of the item causes delivery of the item from the staging area to the customer.

12. The non-transitory computer-readable storage medium of claim 11, wherein applying the preemptive picking model comprises:

applying a time-series model that predicts the predicted demand for a given time period as a function of at least historical demand for the item in historical time periods derived from the historical orders data.

13. The non-transitory computer-readable storage medium of claim 11, wherein determining the hyperparameters further comprises:

randomly setting the hyperparameters and evaluating performance of the machine learning model for different hyperparameter values.

14. The non-transitory computer-readable storage medium of claim 11, wherein applying the preemptive picking model comprises:

applying a machine learning model trained based on the historical orders data to infer demand from various data available to the online concierge system.

15. The non-transitory computer-readable storage medium of claim 11, wherein applying the preemptive picking model comprises:

identifying characteristics of the customer; and applying the preemptive picking model to predict, based at least in part on the characteristics of the customer, that the customer will order the item during the future time period.

16. The non-transitory computer-readable storage medium of claim 11, wherein applying the preemptive picking model further comprises:

generating a set of customer-specific predictions of item purchases for the item based on the historical orders data; and aggregating customer-specific predictions within a geographic area to generate the predicted demand.

17. A computer system comprising:

one or more processors; and a non-transitory computer-readable storage medium storing instructions executable by the one or more processors for performing steps including:

obtaining historical orders data associated with an online concierge system that processes order requests from customers via a customer application, assigns the order requests to available pickers to procure items from warehouses, and generates routing instructions for facilitating deliveries to the customers in accordance with the order requests;

applying a preemptive picking model to the historical orders data, wherein the preemptive picking model is trained to predict, based at least in part on the historical orders data, a predicted demand for a future time period of an item available through the online concierge system, wherein the preemptive picking model is configured using hyperparameters determined by:

applying a machine learning model to historical orders data covering an initial time period with randomly selected hyperparameters;

comparing an output of the machine learning model to observe an error between predicted demand and actual observed demand; and adjusting the hyperparameters based on the comparison to reduce the error;

before receiving an order for the item from a customer during the future time period, sending instructions for preemptively picking the item from a storage location in a warehouse and moving the item to a staging area in a quantity based on the predicted demand, wherein sending the instructions for preemptively picking the item causes preemptive picking of the item from the storage location in the warehouse and moving of the item to the staging area;

receiving, from the customer application, an order including the item; and responsive to receive the order including the item, sending instructions for delivery of the item from the staging area to the customer, wherein sending the instructions for delivery of the item causes delivery of the item from the staging area to the customer.

18. The computer system of claim 17, wherein applying the preemptive picking model comprises:

applying a time-series model that predicts the predicted demand for a given time period as a function of at least historical sales volume for the item in historical time periods derived from the historical orders data.

19. The method of claim 1, wherein determining hyperparameters resulting in the best predictions by comparing an output of the machine learning model to actual observed demand further comprises adjusting the hyperparameters in a manner expected to improve performance in subsequent applications of the preemptive picking model.

* * * * *